Feb. 21, 1950     V. C. LORENZ     2,498,167
AUTOMATIC HAND AND BAND SAW TOOTH SETTING MACHINE
Filed May 6, 1948     2 Sheets-Sheet 2
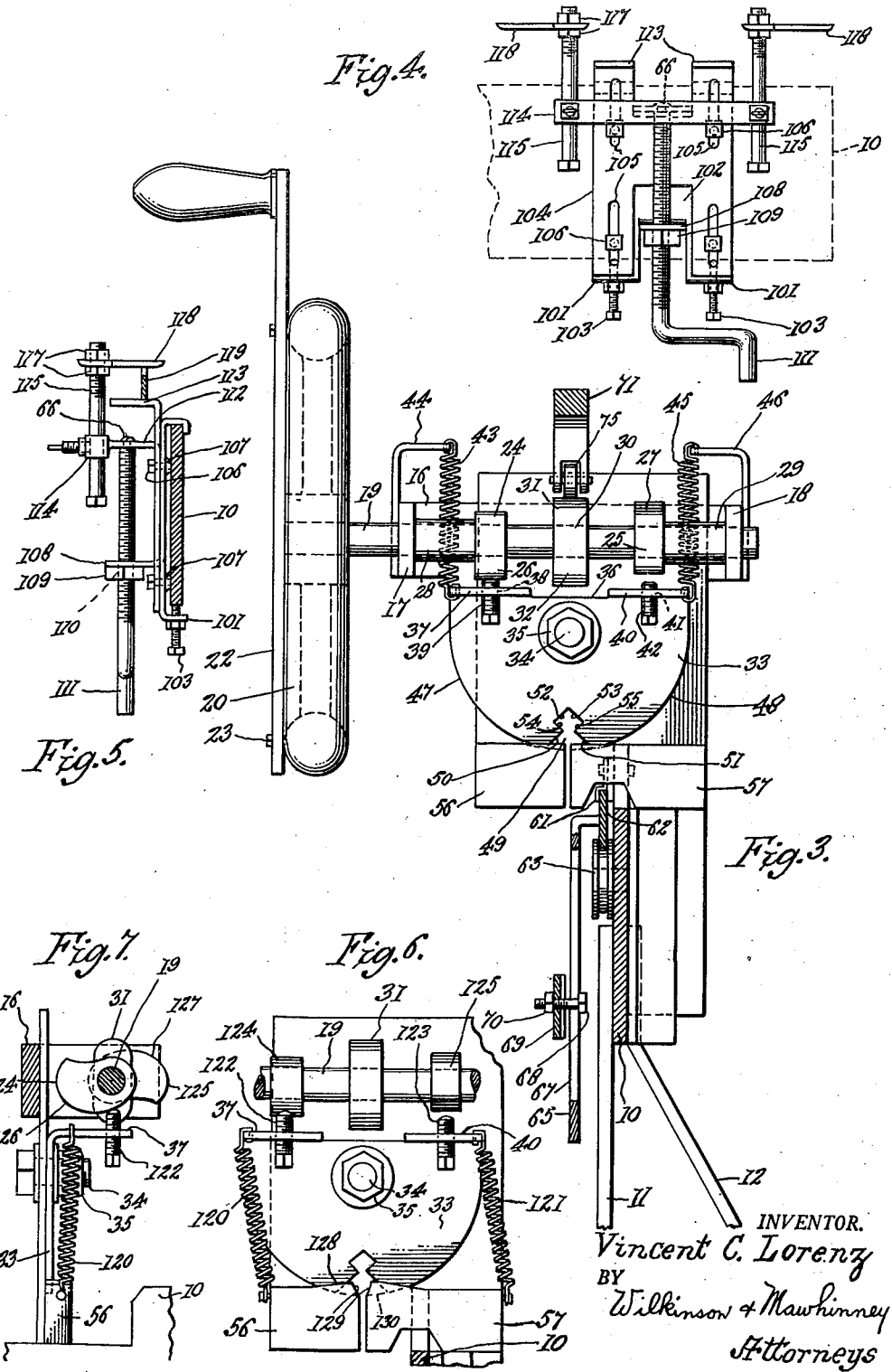
INVENTOR.
Vincent C. Lorenz
BY
Wilkinson & Mawhinney
Attorneys Patented Feb. 21, 1950

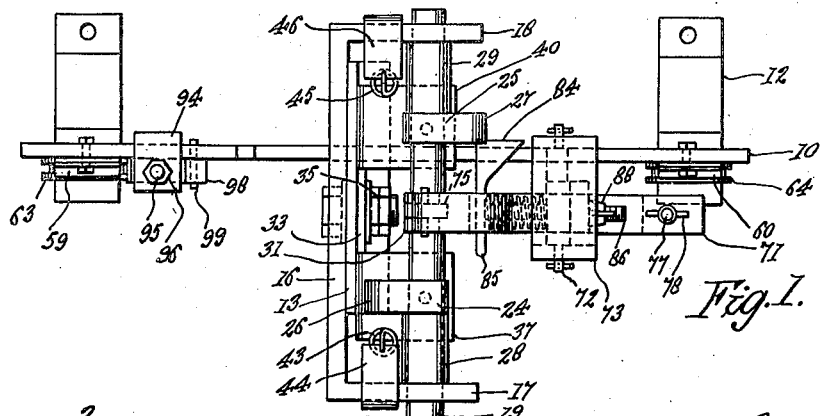

2,498,167

UNITED STATES PATENT OFFICE 2,498,167

AUTOMATIC HAND AND BAND SAW TOOTH-SETTING MACHINE

Vincent C. Lorenz, Anaconda, Mont.

Application May 6, 1948, Serial No. 25,333

5 Claims. (Cl. 76—58)

The present invention relates to improvements in automatic hand and band saw tooth-setting machines and has for an object to provide an improved machine of this kind for automatically setting the teeth of saws.

Another object of the present invention is to provide an improved machine of this character in which the saw is intermittently fed through the machine to bring each successive tooth into setting position.

Still another object of the present invention is to provide an improved saw tooth setting machine in which means are provided for controlling the amount of set given to the teeth.

A further object of the present invention is to provide an improved machine of this type in which means are provided for adjusting the intermittent saw feeding device so that saws having different size teeth can be properly fed through the machine.

A still further object of the present invention is to provide a machine of this kind which is strong and rugged and yet is economical to construct and operate.

With the foregoing and other objects in view, the invention will be hereinafter more fully described and more particularly pointed out in the appended claims.

In the drawings in which the same parts are denoted by the same reference numerals throughout the several views, Figure 1 is a top plan view of a saw tooth-setting machine constructed in accordance with the present invention and showing parts broken away and in section, Figure 2 is a longitudinal vertical sectional view on the line 2—2 of Figure 1, and showing a saw carrier, and Figure 3 is a transverse vertical sectional view on the line 3—3 of Figure 2 and showing a saw carrier.

Figure 4 is a front elevational view of a jig for setting band saw teeth and showing a portion of the setter frame plate in dotted lines, Figure 5 is an end view of the jig and setter frame plate shown in Figure 4, Figure 6 is a transverse vertical sectional view of a modified form of the invention with parts broken away, and Figure 7 is an end view of the modification shown in Figure 6.

Referring more particularly to the drawings, 10 indicates a setter frame plate supported by legs 11 and 12 which are adapted to rest upon the floor of a shop or other building. A cam shaft and setter bracket 13 is supported by the frame plate 10 by a pair of connecting members 14 and 15 which are in the form of angle irons; one flange of each of the members 14 and 15 is connected to the plate 10 and the other flange of each of the members is attached to an opposite side of the bracket 13, as shown in Figure 1.

The bracket 13 extends upwardly above the plate 10 and adjacent its upper free end the bracket has attached thereto a flat plate-like body member 16 of a cam shaft holder. Apertured arms 17 and 18 extend horizontally from the opposite ends of the member 16. The apertures in the arms 17 and 18 are in horizontal alignment and receive therethrough a cam shaft 19 for which they act as bearings. The shaft 19 adjacent one end has a wheel 20 mounted thereon by a set screw 21 and a crank or handle 22 is attached to the wheel 20 by bolts and nuts 23.

Intermediate its ends and within the confines of the arms 17 and 18, the shaft 19 has mounted thereon spaced apart cams 24 and 25 with their cam projections or faces 26 and 27, respectively, circumferentially spaced apart 180 degrees. A spacing sleeve 28 encircles the shaft 19 and has one end abutting the inner face of the arm 17 and its opposite end abutting the adjacent side of the cam 24. A similar spacing sleeve 29 encircles the shaft 19 and has one end abutting the inner face of the arm 18 and its other end abutting the adjacent side of the cam 25. Between the cams 24 and 25 there is mounted on the shaft 19 a third cam 30 having two cam projections or faces 31 and 32 which are diametrically opposed and each of which is circumferentially spaced 90 degrees from the cam faces 26 and 27 of the cams 24 and 25.

A tooth setter or rocker plate 33 is pivotally supported by a pivot pin 34 on the setter bracket 13 beneath the body member 16 of the cam shaft holder. The rocker plate 33 is held on its pivot pin 34 by nuts 35. The intermediate portion of the upper edge of the rocker plate 33 is cut away at 36. A flange 37 extends from the upper edge of the rocker plate 33 at substantially right angles thereto and on one side of the cut away portion 36. The flange 37 lies beneath the cam 24 and has a screw threaded opening 38 therethrough for the reception of a set adjusting screw 39 which is in vertical alignment with the cam 24. A second flange 40 similar to flange 37 is disposed on the opposite side of the cut away portion 36 and extends from the upper edge of the rocker plate 33 at substantially right angles thereto. The flange 40 lies beneath the cam 25 and has a screw threaded opening 41 therethrough for the reception of a set adjusting screw 42 which is in vertical alignment with the cam 25. The screws 39 and 42 are disposed on opposite sides of the pin 34 and adjacent the outer edge of the rocker plate 33.

A coil spring 43 has its lower end attached to the flange 37 adjacent its outer edge and its upper end attached to an L-shaped bracket 44 which is supported by the arm 17 of the cam shaft holder 16. The lower end of a coil spring 45 is attached to the flange 40 adjacent its outer edge and the upper end of the spring is attached to an L-shaped bracket 46 which is supported by the arm 18 of the cam shaft holder 16.

The outer edges 47 and 48 of the rocker plate 33 converge downwardly and the lowermost portion of these edges and the lower medial portion of the rocker plate 33 are cut away to form a saw tooth receiving recess 49. The lowermost walls 50 and 51 of this recess 49 are disposed at an angle of the order of 45 degrees to the vertical medial line of the rocker plate 33. The upper walls 52 and 53 of the recess 49 are also disposed at an angle of the order of 45 degrees to the vertical medial line of the rocker plate 33 and the intermediate walls 54 and 55 of the recess connecting the upper and lower walls are disposed at an angle of the order of 90 degrees to the upper and lower walls. Jaws 56 and 57 of a vise for holding a saw 58 in proper position within the recess 49 are supported by the bracket 13.

A pair of guides 59 and 60 are supported by the frame plate 10, one guide being located adjacent each end of the frame plate 10. Each guide has a flange 61 which is spaced from and parallel to the frame plate 10 to provide a recess for the reception of the upper portion of a carrier bar 62. The lower edge of the carrier bar 62 rides on rollers 63 and 64 which are rotatably supported by the frame plate 10. These rollers 63 and 64 are located in vertical alignment with the guides 59 and 60, respectively. Standards 65 have their upper ends attached to the carrier bar 62 and each of the standards 65 has an elongated vertically extending slot 67 for the reception of a bolt 68. A block 69 is carried by each bolt 68 and in cooperation with its standard 65 is adapted to clamp and hold the saw 58 therebetween. A nut 70 is received by each bolt 68 for holding the blocks 69 in adjusted position for different width saws. The carrier bar 62 belongs to Foley filing machine. After filing saw in machine it is put through setter on same carrier or it can also be equipped with any other filing machines carrier.

A lever 71 is pivotally supported as at 72 to a bracket 73 which is supported by a leg 74 attached to the frame plate 10. One end of the lever 71 is of inverted U-shape and a roller 75 is pivotally supported by the lower free end of the U-shaped portion of the lever 71 in vertical alignment with the cam 30. Adjacent its opposite end the lever 71 is provided with a through screw-threaded passageway 76 for the reception of a screw threaded bolt 77. Wing nuts 78 are received by the upper screw-threaded end of the bolt 77. The lower end of the bolt 77 is attached to the outer free end of an arm 79 which has its opposite end secured to a link 80 by welding or the like. The upper end of the link 80 is bifurcated to provide ears 83 which are pivotally supported by the pivot 72 and the lower end of the link is pivotally connected as at 81 to a pawl or dog 82. The free pointed end of the pawl 82 rests upon the teeth 100 of the saw 58. A standard 84 is supported by the frame plate 10 and carries at its upper end a bracket 85 which supports one end of a bolt 86. The other end of the bolt extends through an aperture 87 in the link 80. The extended portion of the bolt 86 is screw-threaded and receives a wing nut 88. A coil spring 89 encircles the intermediate portion of the bolt 86 and is confined between the bracket 85 and the link 80. The bolt 86 has an apertured extension 90 which receives the upper screw-threaded end of a pin 91. Nuts 92 are received by the screw-threaded portion of the pin 91 and the lower end of the pin 91 is attached to the pawl 82. A coil spring 93 is confined between the extension 90 of the bolt 86 and the upper surface of the pawl 82 for normally urging the pointed end of the pawl 82 into engagement with the teeth 100 of the saw 58.

A bracket 94 is supported by the frame plate 10 adjacent the guide 59 and a pin 95 has its upper screw-threaded end extending through an aperture in the bracket 94. The screw-threaded end of the pin 95 receives a nut 96. A coil spring 97 encircles the pin 95 and has its upper end bearing against the bracket 94 and its lower end engaging a shoe 98 which is pivotally mounted on the frame plate 10 as at 99. The shoe 98 is attached to the lower end of the pin 95 and is held yieldingly against the upper edge of the carrier bar 62 by the spring 97.

In the use of the device a saw 58 is clamped between the standards 65 and the blocks 69 with the saw between the jaws 56 and 57 of the vise so that the teeth 100 are properly positioned in the recess 49 of the plate 33. The cam shaft 19 is then rotated by means of the crank 22 and the wheel 20. This rotation of the cam shaft 19 will bring the cam projection 26 of the cam 24 into engagement with the set-adjusting screw 39 of the rocker plate 33. This will cause the rocker plate 33 to rock on its pivot 34 so that the lower wall 50 of the recess 49 in the plate 33 will engage the tooth of the saw within the recess 49 and impart to it the proper set. When the cam 24 moves the rocker plate 33 on its pivot pin 34, coil spring 43 will be extended so that when the cam projection 26 ceases to contact set-adjusting screw 39 the coil spring 43 will suddenly contract and snap the rocker plate 33 back to its original position.

As the rotation of the cam shaft 19 is continued, the cam projection 31 on the cam 30 will engage the roller 75 on the lever 71 to cause the upward movement of this end of the lever on its pivot 72. The opposite end of the lever 71 will be moved downwardly and through the bolt 77 will swing the arm 79 and the link 80 on the pivot 72 against the action of the spring 89 to move the pawl 82 so that the saw 58 will be moved a distance equal to the width of one tooth 100 through the engagement of the end of the pawl with a tooth of the saw. As soon as the cam projection 31 of the cam 30 is moved out of engagement with the roller 75 of the lever 71, coil spring 89 will expand to move the link 80, the arm 79 and the lever 71 back to their original positions. Through the movement of the pawl 82 the next adjacent tooth of the saw is brought into proper saw setting position within the recess 49 of the rocker plate 33. The continued rotation of the cam shaft 19 will cause the cam projection 27 of the cam 25 to engage its set adjusting screw 42 so that the rocker plate will be swung on its pivot pin 34 in a direction opposite to that caused by the cam 24. This movement of the rocker plate 33 will cause the lower wall 51 of the recess 49 in the plate 33 to engage the tooth which has just been moved into setting position. The rocker plate 33 will be snapped back to its original position by means of coil spring 45. Upon further rotation of the cam shaft 19 the other cam projection 32 of the cam 30 will engage the roller 75 of the lever 71 so that the pawl 82 will move the saw 58 a distance equal to the width of a tooth 100 of the saw. Since the cam 30 is provided with two cam projections 31 and 32 which are diametrically opposed, two successive adjacent teeth may be set for each rotation of the cam shaft 19.

The spring 97 and shoe 98 provide a tension brake for the saw carrier bar 62 to prevent the saw from moving too great an amount when the saw is being fed through the machine. By adjustment of the bolt 77 in the screw-threaded passageway 76 in the lever 71, the length of the stroke of the feeder pawl 82 can be adjusted for different size teeth of various saws. The back motion of the pawl 82, link 80 and lever 71 is controlled by the position of wing nut 88 on the bolt 86 so as to move the saw only the distance of one tooth at a time.

The amount of set given to the saw teeth is controlled by changing the distance between the set adjusting screws 39 and 42 and their respective cams 24 and 25 so that the distance of travel of the rocker plate 33 can be varied.

This improved setting machine will set any saw from sixteen points to three points to the inch. It will also set any band saw from one-fourth to one and one-half inches wide with the addition of the small attachment for that purpose.

Figures 4 and 5 show a jig for setting the teeth of band saws which includes a pair of C-clamps 101 connected by a web 102 having binding screws 103 for detachably supporting the jig upon the setter frame plate 10. An H-shaped plate 104 having slots 105 is adjustably supported by the clamps 101 by means of bolts 106 which extend through the slots 105 and receive nuts 107.

Adjacent its lower end the web 102 has a cut away portion 108 which is bent forwardly and upwardly at an angle of the order of 90 degrees to the web to form a bracket. The bracket 108 has secured thereto against rotation a nut 109. The bracket 108 and the nut 109 have aligned interiorly screw-threaded openings 110 which receive a screw-threaded crank 111. The intermediate upper end of the plate 104 has a cut away portion 112 which is bent forwardly and downwardly at an angle of the order of 90 degrees to the plate to form a flange. The flange 112 has a smooth bore opening which receives the upper headed end 66 of the crank 111 so that the crank can rotate within the opening in the flange 112, but the crank will carry the flange with it in its vertical movements. On each side of the flange 112 the upper end of the plate 104 is bent forwardly and downwardly at an angle of the order of 90 degrees to the plate 104 to provide lower saw guides 113.

A bar 114 is secured as by welding or the like to the forward free end of the flange 112. Adjacent each end the bar 114 has a vertically extending through opening having a smooth bore for the reception of adjusting bolts 115 which are held in adjusted position by set screws 116. The upper end of each bolt 115 is screw threaded and a pair of nuts 117 releasably clamp an upper saw guide 118 therebetween.

In use, the jig shown in Figures 4 and 5 is employed in lieu of the saw carrier illustrated in Figures 2 and 3 when it is desired to set the teeth of a band saw indicated at 119. The band saw 119 is placed between the jaws 56 and 57 of the vise with its back edge resting on the upper surface of the guides 59 and 60. The band saw jig is then slipped under the band saw 119 with the upper guides 118 turned outwardly as shown in Figure 4. The crank 111 is then rotated until the lower guides 113 are properly positioned so that the back of the band saw 119 rests upon the lower guides 113. At this time the upper guides 118 can be swung around and adjusted by means of the bolts 115 and set screws 114 until the guides 118 rest lightly on the teeth of the saw 119. The operation of the machine will then be as described above.

Figures 6 and 7 disclose a hammer type setter as distinguished from the pusher type as illustrated in Figures 1, 2 and 3. Referring more particularly to Figures 6 and 7, the upper end of a compression spring 120 is attached to the flange 37 on the rocker plate 33 and its lower end is attached to jaw 56 of the vise. A second compression spring 121 has its upper end attached to the flange 40 on the rocker plate 33 and its lower end secured to the jaw 57 of the vise. Set adjusting screws 122 and 123 are carried by the flanges 37 and 40, respectively. These adjusting screws 122 and 123 are longer than the adjusting screws 39 and 42 shown in Figure 3. End cams 124 and 125 are mounted on the cam shaft 19. These cams 124 and 125 have cam faces 126 and 127, respectively, which are disposed 180 degrees apart. It will be noted that the highest points of these cam faces 126 and 127 abruptly rise from the lowest portions of the surfaces of the cams and are located at a much greater distance from the axis of the cam shaft 19 than are the cam faces 26 and 27 of the cams 24 and 25.

The jaws 56 and 57 of the vise are slightly built up by having their upper surfaces inclined upwardly towards each other as indicated at 128 in Figure 6 and the upper ends of the opposed faces of the jaws are beveled as indicated at 129 so as to provide a slot 130 for the rocker plate 33.

In the use of the modified form of the invention shown in Figures 6 and 7 when the cam face 126 or 127 engages its set adjusting screw 122 or 123 a sharp hammer blow will be struck the saw tooth by the rocker plate. The movement of the rocker plate will alternately place the springs 120 and 121 under compression and when the cams 124 and 125 have moved out of contact with their respective adjusting screws the springs will quickly return the rocker plate to its original position.

It is obvious that various changes and modifications may be made in the details of construction and design of the above specifically described embodiment of this invention without departing from the spirit thereof, such changes and modifications being restricted only by the scope of the following claims.

What I claim is:

1. An improved saw tooth setting machine comprising a frame plate, a support for a saw supported by the frame plate, a rocker plate supported by said frame plate and having opposed surfaces for alternately striking successive adjacent saw teeth from opposite sides of a saw, a cam shaft supported by said frame plate, a pair of cams on said cam shaft for moving the rocker plate alternately in opposite directions for striking the saw teeth, a third cam on said cam shaft, a pawl supported by the frame plate and engaging the teeth of the saw, and an operative connection between said pawl and the third cam for intermittently moving the saw the distance of one tooth and including a link having its upper end pivotally supported by the frame plate and its lower end pivotally connected to the pawl and having a through aperture intermediate its ends, a bracket supported by the frame plate, a screw-threaded bolt supported by said bracket with its threaded end passing through the aperture in the link and extending therebeyond, a coil spring encircling the bolt and having one end bearing against the bracket and its other end bearing against the link, and a nut received by the extended screw-threaded end of the bolt for adjusting the tension of the coil spring.

2. An improved saw tooth setting machine as claimed in claim 1 characterized by the fact that the head of the bolt has an apertured extension, a pin is provided having its lower end connected to the pawl and its upper end screw-threaded and passing through and beyond the extension, a coil spring surrounds the pin and is confined between the pawl and the extension, and a lock nut is received by the projecting screw-threaded end of the pin.

3. An improved saw tooth setting machine comprising a frame plate, a support for a saw supported by the frame plate, a rocker plate supported by said frame plate for rocking movement and having opposed surfaces for alternately striking successive adjacent saw teeth from opposite sides of a saw, a cam shaft supported by said frame plate, and a pair of cams on said cam shaft for moving the rocker plate alternately in opposite directions for striking the saw teeth, a third cam on said cam shaft having two diametrically opposed cam faces, a pawl supported by the frame plate and engaging the teeth of a saw, and an operative connection between said third cam and the pawl for intermittently moving the saw the distance of a tooth, a pair of L-shaped brackets supported by the frame plate, a coil spring having one end attached to the rocker plate and its other end attached to one of the L-shaped brackets, and a second coil spring having one of its ends attached to the rocker plate and its other end attached to the other L-shaped bracket.

4. An improved saw tooth setting machine as claimed in claim 3 characterized by the fact that the rocker plate is supported by a setter bracket, which is supported by the frame plate and the cam shaft is supported by a holder which is supported by the setter bracket, and that a wheel and crank are mounted on the cam shaft for rotating the cam shaft.

5. An improved saw tooth setting machine comprising a frame plate, a support for a saw supported by the frame plate, a rocker plate supported by said frame plate for rocking movement and having opposed surfaces for alternately striking successive adjacent saw teeth from opposite sides of a saw, a cam shaft supported by said frame plate, and a pair of cams on said cam shaft for moving the rocker plate alternately in opposite directions for striking the saw teeth, a screw adjustably supported by the rocker plate in the path of each cam for permitting adjustment of each screw towards and from its respective cam, each of said cams having an abrupt high cam surface for imparting to the rocker plate a hammer like blow, compression springs supported by the rocker plate and the frame plate for returning the rocker plate to its original position after each striking movement, and a vise having a pair of opposed jaws adapted to engage the saw, the upper surfaces of the jaws of the vise being inclined upwardly towards each other and the upper ends of the jaws being beveled upwardly away from each other for providing a slot for the movement of the rocker plate.

VINCENT C. LORENZ.

REFERENCES CITED

The following references are of record in the file of this patent:

UNITED STATES PATENTS

| Number | Name | Date |
| --- | --- | --- |
| 335,596 | Landgraf | Feb. 9, 1886 |
| 557,959 | Bredin | Apr. 7, 1896 |
| 767,130 | Addison | Aug. 9, 1904 |
| 2,109,161 | Biro | Feb. 22, 1938 |
| 2,343,171 | Collier | Feb. 29, 1944 |
| 2,461,782 | Stadick | Feb. 15, 1949 |

FOREIGN PATENTS

| Number | Country | Date |
| --- | --- | --- |
| 27,622 | Great Britain | 1910 |
| 435,671 | France | Jan. 4, 1912 |
| 443,829 | France | July 23, 1912 |